P. W. TOOTH.
TRANSMISSION GEARING.
APPLICATION FILED JAN. 6, 1917.
1,246,683.
Patented Nov. 13, 1917.
2 SHEETS—SHEET 1.
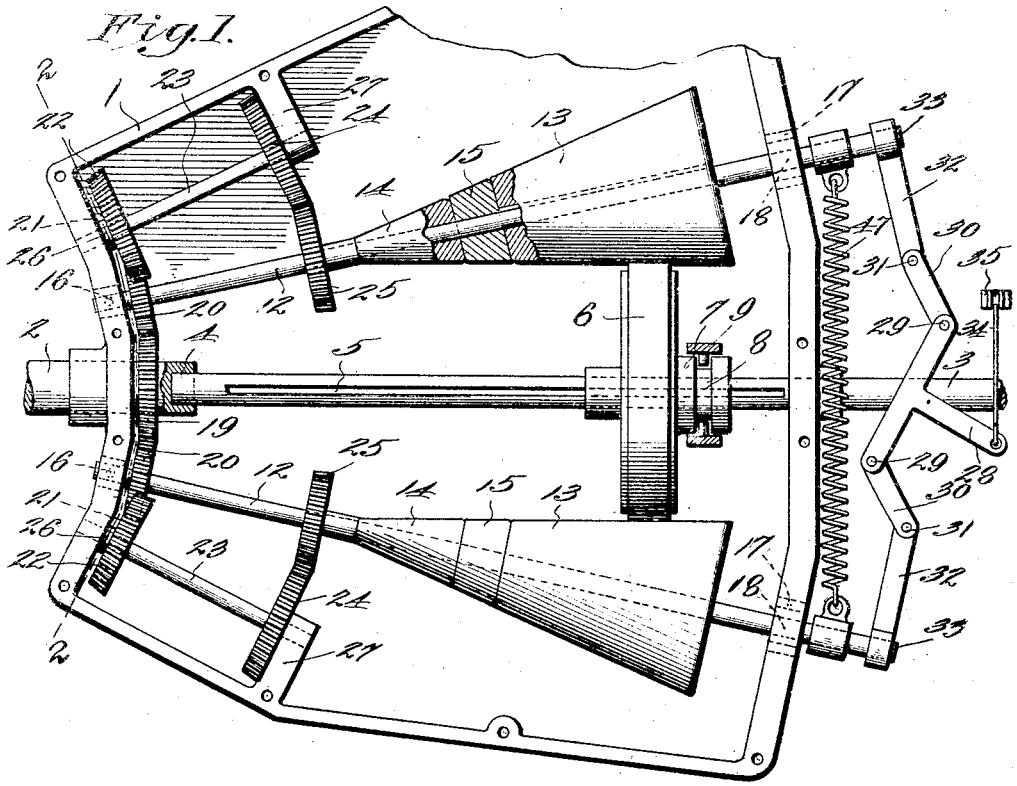
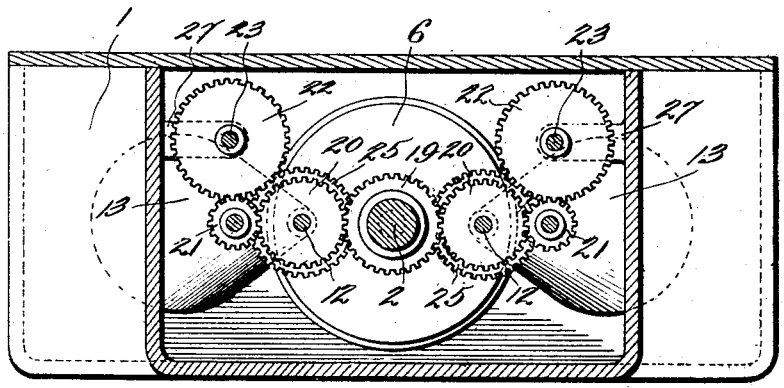
WITNESSES
INVENTOR
P. W. Tooth,
BY Victor J. Evans
ATTORNEY

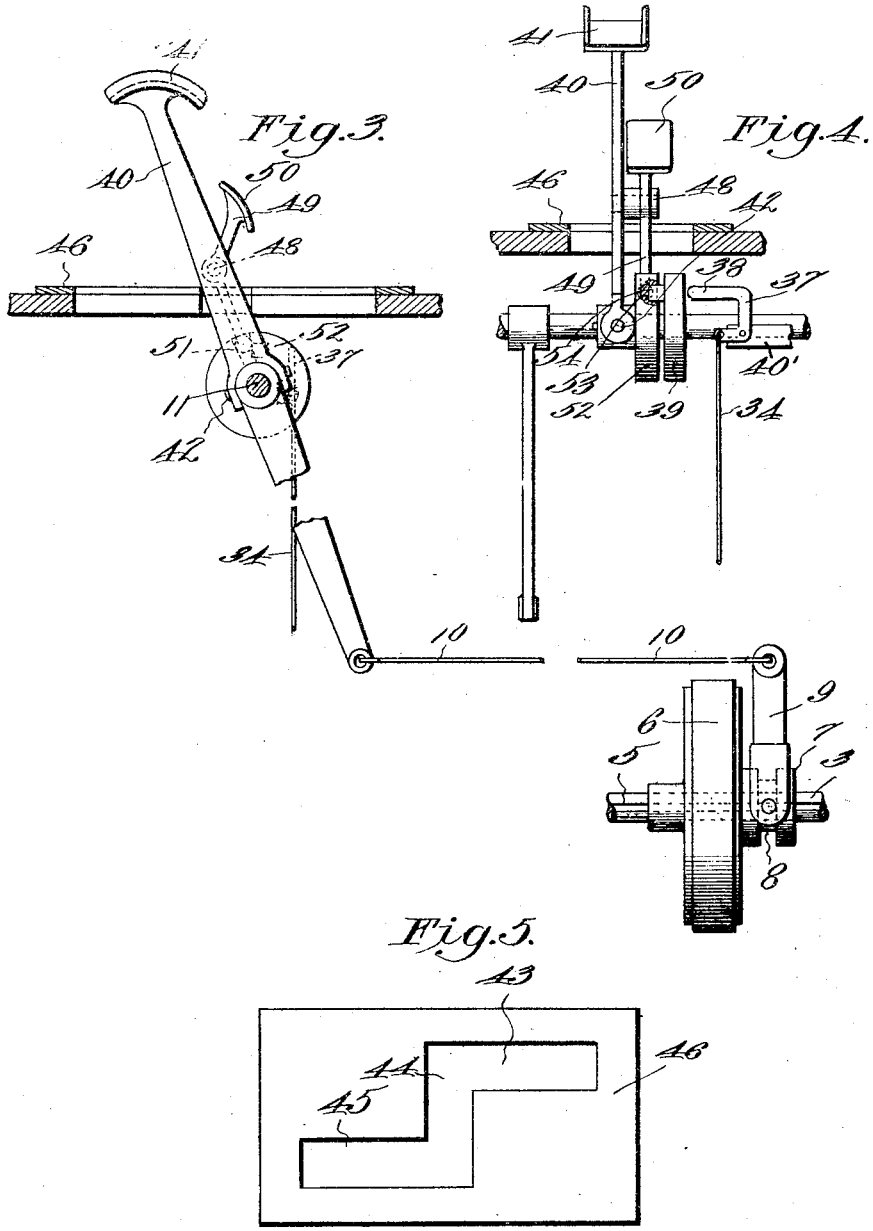

UNITED STATES PATENT OFFICE.

PERCY WALTER TOOTH, OF LOS ANGELES, CALIFORNIA.

TRANSMISSION-GEARING.

1,246,683.  Specification of Letters Patent.  Patented Nov. 13, 1917.

Application filed January 6, 1917. Serial No. 140,973.

*To all whom it may concern:*

Be it known that I, PERCY W. TOOTH, a subject of the King of Great Britain, residing at Los Angeles, in the county of Los Angeles and State of California, have invented new and useful Improvements in Transmission-Gearings, of which the following is a specification.

This invention relates to transmission gearing the object in view being to provide variable speed gearing adapted for use in connection with the driving mechanism of automobiles, motor trucks, marine engines and in other places which will suggest themselves to the manufacturer.

One of the objects of the present invention is to do away with the ordinary toothed gears by which the different ratios of speed are obtained thus eliminating all danger of stripping the gears due to shifting the same into and out of mesh.

Another object in view is to employ cone shaped transmission members combined with a friction wheel driven thereby, and means for moving said cone shaped transmission members into and out of engagement with said friction wheel, also means for shifting the friction wheel longitudinally of the cone shaped transmission members, for producing the result above referred to.

Another object of the invention is to provide manually controlled means, operable for example by the driver's foot, whereby with the aid of one foot alone, all the necessary operations may be performed to change from one speed to another.

With the above and other objects in view, the invention consists in the novel construction, combination and arrangement of parts, herein described, illustrated and claimed.

In the accompanying drawings:—

Figure 1 is a plan view partly in section, illustrating the improved transmission gearing.

Fig. 2 is a cross section on the line 2—2 of Fig. 1, showing the arrangement of the gears between the driving shaft and the countershafts, whereby the driven shaft may be operated at different speeds and in different directions.

Fig. 3 is a detail view of the manually controlled operating means.

Fig. 4 is a view taken at a right angle to Fig. 3.

Fig. 5 is a detail view of the guide plate for the speed changing lever.

Referring to the drawings 1 designates a frame or casing in which the changeable speed transmission gearing is mounted, the shape of said casing being such as to compactly inclose the working parts of the transmission gearing. As shown, the casing 1, in plan, is fan shaped, being wider at one end than at the other.

2 represents the driving shaft and 3 the driven shaft. These shafts are journaled in bearings in opposite ends of the casing 1 and are arranged in longitudinal alinement with each other. The shaft 2 is shown as formed at one end with a bore 4 which forms a bearing for the adjacent and overlapping extremity of the driven shaft 3 which is shown as having its extremity inserted in the bearing 4. This insures the maintenance of the two shafts in longitudinal alinement.

The shaft 3 is formed with a longitudinal key-way 5 to receive the key of a friction wheel 6 which is slidable longitudinally of the shaft 3 but always rotates therewith by reason of its being keyed thereto. The friction wheel 6 is provided with an extended hub or collar 7 formed with a groove 8 to receive the forked end of a shifting lever 9 coupled by means of a connection 10 with a shaft 11 which is operated in a manner and by means hereinafter described.

Arranged at opposite sides of the shaft 3 are oblique countershafts 12 each of which carries a cone-shaped transmission member 13 fast thereon, a relatively small cone-shaped member 14 loose thereon, and an intermediate frusto-conical and relatively narrow idler member 15. The working faces of the members 13, 14 and 15 are all flush and all three of said members when combined form a cone-shaped body of sectional construction, the friction wheel 6 being adapted to be shifted the entire combined length of the members 13, 14 and 15 so as to frictionally engage either one of said members.

Each shaft 12 is mounted at one end in a swivel bearing 16, permitting the opposite extremity thereof to be moved toward and away from the shaft 3, the casing 1 being, for that purpose, formed with guide-slots 17 in which are mounted slidable bearings 18 in which the shafts 12 are journaled. Fast on the shaft 2 is a gear 19 which meshes with other gears 20 at opposite sides thereof and fast on the shafts 12. Thus the conical members 13 are positively driven in the same direction by the shaft 2 through the medium of the gears 19 and 20. Each gear 20 meshes with an idler gear 21 and the latter in turn meshes with a gear 22 fast on a countershaft 23 having fast thereon at a suitable point another gear 24 which meshes with still another gear 25 fast on the adjacent transmission member 14, the latter being thus driven in the reverse direction from the member 13. Therefore when the members 13 engage the friction wheels 6, the latter is driven in a certain direction, preferably that direction which drives the vehicle in a forward direction, and when the members 14 are in driving engagement with the wheel 6, the latter is driven in the reverse direction for backing the vehicle. For low speed, the friction wheel 6 is shifted into frictional engagement with the smaller ends of the transmission members 13 and when high speed is desired, the wheel 6 is moved into the position to be driven by the larger ends of the members 13. By adjusting the wheel 6 to intermediate points, other ratios of speed less than the highest and greater than the lowest are obtained. The countershafts 23 are mounted in bearings 26 and 27 carried by the casing 1.

The means for shifting the transmission members 13 into and out of driving engagement with the wheel 6, comprises a T-shaped lever 28 which is connected by pivots 29 to toggle links 30 connected in turn by pivots 31 to shift members 32 each of which has a bearing opening 33 for the adjacent end of the respective countershaft 12. From the central arm of the lever 28, a connection 34 extends around a guide 35 to a bell crank lever 37 mounted on a suitable support and provided with an extension arm 38 having a fixed relation to one arm of the bell crank lever 37 and lying in the path of and adapted to be operated upon by a collar 39 mounted to slide longitudinally of a supporting bar 40' to which the bell crank lever 37 is shown as pivoted.

40 represents a manually operable lever such as a foot lever, said lever embodying the expanded end portion 41 adapted to receive the ball of the foot. The lever 40 is connected by a pivot 42 to the shaft 11 above referred to, which shaft extends transversely of the vehicle and at right angles to the shafts 2 and 3, the lever 40 being thus adapted to be rocked laterally so that it may lie in one of the three portions 43, 44 and 45 of a guide-way formed in a floor plate 46 fastened to the floor of the vehicle in proper position to enable the foot of the operator to be applied to the lever 40. When the lever 40 is in the longer portion 43 of the slot in the floor plate, the wheel 6 may be engaged with the transmission members 13 at any point in the length thereof. When the lever occupies the portion 44 of the guide-way, the wheel 6 engages the idle members 15 and when the lever occupies the portion 45 of the guide-way, the wheel 6 is in position to engage the transmission members 14. The lateral offset or transverse portion 44 of the guide-way thus prevents the lever 40 from being shifted directly from a speed ahead to a speed reverse and vice versa. The shafts 12 are normally held toward each other by yieldable means 47 shown in the form of a spring the extremities of which are connected to the slidable bearing members 18 above described, the spring 47 thus acting to hold the transmission members 13 and 14 in driving engagement with the friction wheel 6, which constitutes the driven member of the friction wheels, while the members 13 and 14 constitute the driving elements of the friction gearing.

The lever 40 is provided at a suitable point with a laterally projecting journal 48 upon which is mounted an auxiliary lever 49 the free end of which is expanded as shown at 50 so as to enable the pressure of the heel of the operator's foot to be applied thereto. The lower arm of the lever 49 fits into a recess 51 in a collar 52 on the shaft 11 and said collar 52 is formed with a depression 53 in the side face thereof, having an inclined floor which coöperates with a projection 54 on the slide collar 39 above referred to. The lever 49 may be operated independently of the lever 40 and when so operated it imparts a partial turning movement to the collar 52 thereby producing a cam or wedging action between the collars 52 and 39, which causes the latter to operate against the extension arm 38 of the bell crank lever 37 and thereby through the connections described the T-shaped lever 28 is operated to thrust the transmission members 13 or 14 as the case may be out of engagement with the friction wheel 6. When pressure is removed from the lever 49, the spring 47 draws the transmission members 13 or 14 as the case may be into driving engagement with the friction wheel 6. Any suitable means may be employed for retaining the lever 40 in any position into which it may have been adjusted.

The mechanism above described provides a simple, reliable and changeable speed gearing for the purpose stated, eliminates any danger of stripping gears, is simple in its operation and may be operated by one foot, or one hand in case a hand lever is employed, and the mechanism also dispenses with the necessity of using the clutch now in use in the present day automobile practice. Furthermore the mechanism compensates for wear between the members 13, 14 and 6 as the spring 17 takes care of this feature.

I claim:—

1. In transmission gearing, the combination of a driving shaft, a driven shaft in longitudinal alinement therewith, countershafts arranged at opposite sides of the driven shaft and in angular relation thereto, positive driving means between said driving shaft and said countershafts, conical friction transmission members fast on said countershafts, a friction wheel keyed to but slidable longitudinally of said driven shaft and adapted to engage said transmission members at different points in the length thereof, means for shifting said transmission members toward and away from the driven shaft, means for shifting said friction wheel longitudinally of said driven shaft, other conical friction driving members loose on said countershafts, and positive driving means actuated by said driving shaft for rotating the last named transmission members in a reverse direction from the first named transmission members.

2. In transmission gearing, the combination of a driving shaft, a driven shaft in longitudinal alinement therewith, countershafts arranged at opposite sides of the driven shaft and in angular relation thereto, positive driving means between said driving shaft and said countershafts, conical friction transmission members fast on said countershafts, a friction wheel keyed to but slidable longitudinally of said driven shaft and adapted to engage said transmission members at different points in the length thereof, means for shifting said transmission members toward and away from the driven shaft, and means for shifting said friction wheel longitudinally of said driven shaft, the means for shifting said transmission members and the means for shifting said friction wheel embodying two manually operable levers one of which has a pivotal relation to the other.

3. In transmission gearing, the combination of a driving shaft, a driven shaft in longitudinal alinement therewith, countershafts arranged at opposite sides of the driven shaft and in angular relation thereto, positive driving means between said driving shaft and said countershafts, conical friction transmission members fast on said countershafts, a friction wheel keyed to but slidable longitudinally of said driven shaft and adapted to engage said transmission members at different points in the length thereof, means for shifting said transmission members toward and away from the driven shaft, and means for shifting said friction wheel longitudinally of said driven shaft, the means for moving said countershafts away from each other and from the driven shaft embodying a single T-shaped lever arranged between said countershafts, shift members extending inwardly from said countershafts, and toggle links connecting the arms of said lever with said shift members of the countershafts.

In testimony whereof I affix my signature.

PERCY WALTER TOOTH.

Copies of this patent may be obtained for five cents each, by addressing the "Commissioner of Patents, Washington, D. C."